United States Patent [19]

Charmot et al.

[11] Patent Number: 5,331,042
[45] Date of Patent: Jul. 19, 1994

[54] POLYOXYALKYLENEAMINE-NEUTRALIZED, LOW MFFT AQUEOUS DISPERSIONS OF ETHYLENIC/CARBOXYLIC POLYMERS

[75] Inventors: Dominique Charmot, Paris; Roland Reeb, Gressy, both of France

[73] Assignee: Rhone-Poulenc Chimie, Courbevoie, France

[21] Appl. No.: 792,676

[22] Filed: Nov. 15, 1991

[30] Foreign Application Priority Data

Nov. 15, 1990 [FR] France ................... 90 14197

[51] Int. Cl.$^5$ ............................................. C08L 31/00
[52] U.S. Cl. .................................... 524/556; 524/243; 525/329.9
[58] Field of Search ............................... 524/556, 243; 525/329.9

[56] References Cited

U.S. PATENT DOCUMENTS

| | | | |
|---|---|---|---|
| 4,341,680 | 7/1982 | Hauber et al. | 525/329 |
| 4,413,082 | 11/1983 | Gleichenhagen et al. | 524/243 |
| 4,689,131 | 8/1987 | Roue et al. | 523/415 |

FOREIGN PATENT DOCUMENTS 0058382 8/1982 European Pat. Off.
2447956 8/1980 France.

OTHER PUBLICATIONS

Database WPIL, No. 84-240043, Derwent Publications Ltd., Londres, GB; & JP-A-59 142 242 (Toray Ind. Inc) Aug. 15, 1984.

*Primary Examiner*—Paul R. Michl
*Assistant Examiner*—Edward Cain
*Attorney, Agent, or Firm*—Burns, Doane, Swecker & Mathis

[57] ABSTRACT

Low MFFT aqueous polymer dispersions of film-forming, relatively low Tg ethylenic/carboxylic polymer particulates, e.g., styrene/alkyl acrylate/acrylic acid copolymer particles, are well adapted for the production of wear- and soil-resistant coatings and adhesives, and include an effective, at least partially "neutralizing" amount of a polyoxyalkyleneamine, e.g., a polyoxyalkyleneamine bearing at least one primary and/or secondary amine functional group.

26 Claims, No Drawings

POLYOXYALKYLENEAMINE-NEUTRALIZED, LOW MFFT AQUEOUS DISPERSIONS OF ETHYLENIC/CARBOXYLIC POLYMERS

BACKGROUND OF THE INVENTION

1. Field of the Invention

The present invention relates to aqueous dispersions of film-forming polymers prepared from ethylenically unsaturated monomers, and, more especially, to latices of acrylic or vinyl polymers containing a polyoxyalkyleneamine which includes, per molecule, at least one primary and/or secondary amine functional group.

This invention also relates to aqueous coating compositions comprising such dispersions.

2. Description of the Prior Art

Aqueous dispersions of addition polymers prepared from ethylenically unsaturated monomers are commonly employed as binders for fillers and pigments sought to be fixed or secured onto a substrate for various applications such as paints, adhesives, sealing and impermeability coatings, paper coating and the like.

For these applications, the effectiveness of the dispersion in forming a resistant film after a surface is coated depends on the glass transition temperature Tg of the dispersed polymer and on the minimum film-formation temperature MFFT of the dispersion, which determines the ability of the particles to coalesce.

It is generally desirable that the MFFT should be lower than room temperature and as low as possible. However, it is generally accepted that so-called "soft" resins of low Tg produce coatings whose resistance to wear and to soiling is less than that of the so-called "hard" resins.

A traditional technique for lowering the MFFT of a relatively hard polymer entails adding an inert plasticizer of the phthalate or polyalkylene glycol type and/or a coalescing agent to the coating composition. These additives are not entirely satisfactory and, in the case of coalescing agents which are volatile materials, they present the major disadvantage of creating environmental and atmospheric pollution risks.

Another technique for providing latices which have a low MFFT from monomers forming a "hard" polymer entails incorporating into the polymer chain hydrophilic monomer recurring structural units containing hydroxyl, amine, acetate or carboxylic acid functional groups. However, the film produced often exhibits a very high water sensitivity and a poor abrasion resistance, especially in a wet medium.

SUMMARY OF THE INVENTION

Accordingly, a major object of the present invention is the provision of improved stable aqueous dispersions of polymers which can be used as binders for fillers, which have a good film-forming capability at low temperature and which can be converted into coatings having enhanced properties, especially in respect of abrasion and soiling resistance.

Another object of the present invention is the provision of compositions which require little or no coalescing agent or organic compounds of low molecular weight.

Briefly, the present invention features aqueous dispersions of polymers prepared from ethylenically unsaturated monomers, such polymers also comprising recurring comonomeric structural units containing carboxylic acid groups, and said aqueous dispersions also containing a polyoxyalkyleneamine which comprises, per molecule, at least one primary and/or secondary amine functional group.

DETAILED DESCRIPTION OF THE PREFERRED EMBODIMENTS OF THE INVENTION

More particularly according to the present invention, it is known to this art to incorporate polyoxyalkylenepolyamines in compositions comprising acrylic polymers containing an epoxy group (EP-A-172,460). The polyamine is employed for a crosslinking purpose, however, which is the antithesis of the function of the polyoxyalkyleneamine per the present invention.

The polyoxyalkyleneamines according to the invention are known compounds, comprising polyether chain sequences $(O-CH(R)-CH_2)$ wherein R is a hydrogen atom or an alkyl radical having from 1 to 6 carbon atoms, and containing one or more primary and/or secondary amine functional groups attached to the end of the chain and/or incorporated along the backbone of the polymer chain. The polyether backbone is preferably a propylene oxide polymer or an ethylene oxide/propylene oxide copolymer having a PO/EO molar ratio greater than 1.

These polyoxyalkyleneamines thus comprise at least one primary and/or secondary amine functional group per molecule thereof.

The primary monoamines are preferred. The molecular weight of such polymers advantageously ranges from approximately 140 to 10,000, and preferably from approximately 400 to 4,000.

Particularly representative polyoxyalkylenemonoamines have the structural formula:

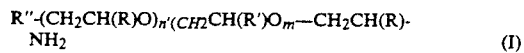

(I)

in which $R''$ is a $C_1-C_6$ alkoxy radical, preferably $CH_3O-$, R and $R'$ are H or a $C_1-C_6$ alkyl radical, and $n+m$ are numbers such that the amine has a molecular weight ranging from about 140 to 10,000, with the proviso that n or m may be zero.

Specific and preferred examples of such amines are polyoxypropylenemonoamine and polyoxyethylene-/polyoxypropylenemonoamine block copolymers of the formula

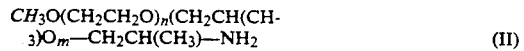

(II)

wherein n ranges from 1 to 40 and m ranges from 2 to 40, with, preferably, $m>n$.

A series of monoamines of this type are commercially available from Texaco Chemical Inc. under the trademark Jeffamine ® M.

Other particularly representative polyoxyalkyleneamines are the diamines of formula (III): $H_2N-CH(R)CH_2-(OCH(R')CH_2)_a-(OCH(R'')CH_2)_b-(OCH_2CH(R'))_c-NH_2$ wherein R, $R'$ and $R''$ are each H or a $C_1-C_6$ alkyl radical, $a+b+c$ are number such as to provide a molecular weight of about 140 to 10,000.

Preferred such diamines are the polyoxypropylenediamines ($R=R'=R''=CH_3$) wherein $a+b+c$ preferably ranges from 5 to 70 and polyoxyethylene/polyoxypropylene block diamines (wherein the formula (III) R and $R'$ are $CH_3$ and $R''$ is H), predominantly comprising propylene oxide ($a+c>b$).

Also exemplary are the diamines of the general formula

NH$_2$—A—NH—CO—NH—B—NH$_2$ wherein A nd B are C$_2$-C$_8$ polyether, preferably polyoxypropylene, groups. These compounds can be prepared by coupling a polyoxyalkyleneamine with urea.

All of these diamines are marketed by Texaco Chemical Inc. under the trademarks Jeffamine ® D series, ED series and DU series.

Exemplary triamines are the compounds of the formula

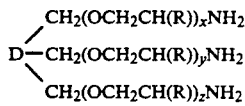
(VI)

wherein D is a hydrocarbon residue derived from a triol such as, for example, glycerol or trimethylolpropane, R is H or a C$_1$-C$_6$ alkyl radical and x+y+z is a number ranging from 5 to 90. R is preferably CH$_3$. Triamines of this type are marketed by Texaco as the Jeffamine ® T series.

The aqueous polymer dispersions are preferably acrylic or vinyl ester latices which are prepared by the radical copolymerization of unsaturated monomers in an aqueous medium. Monomer units containing at least one carboxylic acid functional group are necessarily incorporated into the polymer. Exemplary such carboxylic acid monomers include acrylic acid, methacrylic acid, fumaric acid, crotonic acid, itaconic acid, mesaconic acid, maleic acid and citraconic acid, as well as monoesters of dicarboxylic acids with alkanols having from 1 to 4 carbon atoms and the N-substituted derivatives thereof. The amount of carboxylic acid monomer advantageously ranges from 0.1% to 10%, preferably from 0.5% to 6% by weight, of the total weight of the copolymerizable monomers.

Exemplary such monomers which can be copolymerized either alone or mixed comprise esters of acrylic acid and methacrylic acid with C$_1$-C$_{18}$, preferably C$_1$-C$_8$, alkanols, such as methyl acrylate, ethyl acrylate, propyl acrylate, n-butyl acrylate, isobutyl acrylate, 2-ethylhexyl acrylate, methyl methacrylate, ethyl methacrylate, n-butyl methacrylate and isobutyl methacrylate; vinyl esters of a carboxylic acid, such as vinyl acetate, vinyl versatate, vinyl propionate and vinyl butyrate; and vinylaromatic compounds such as styrene, α-methylstyrene, vinyltoluene, monochlorostyrene, and the like.

These monomers are often copolymerized with other ethylenically unsaturated monomers for the preparation of latices destined for coating applications. Exemplary such "other" monomers include diene compounds, for example 1,3-butadiene, 2-methyl-1,3-butadiene, 2,4-dimethyl-1,3-butadiene, 2-chloro-1,3-butadiene, and the like, vinyl nitriles having from 3 to 12 carbon atoms, in particular acrylonitrile and methacrylonitrile, amides of unsaturated carboxylic acids, such as acrylamide and methacrylamide, dialkyl esters of ethylenically unsaturated dicarboxylic acids, such as dialkyl esters of fumaric acid, of maleic acid and of itaconic acid, vinyl chloride and vinylidene chloride.

Other monomers which may contain functional radicals and which are used to impart specific properties, or to improve the stabilization of the particles, may also be included in the copolymerization recipe. Exemplary such functional radicals include, in particular, sulfate or sulfonate radicals in the form of a salt or of unneutralized acid, amido, including substituted amido, such as alkoxyalkylamido and alkylolamido, isocyanato, keto, aidehyde, hydroxyl, silane, ureido, oxazonidyl, oxazinyl or acetoacetyl, but also a site of unsaturation of allyl, vinyl, (meth)acryloyl or dicyclopentenyl type.

Representative of the final product aqueous copolymer dispersions are those latices comprising:

(i) 0% to 75%, preferably 10% to 60% by weight of styrene;

(ii) 15% to 99.9% by weight of one or more (meth)acrylates;

(iii) 0.1% to 10% of one or more ethylenically unsaturated carboxylic acids; and (iv) 0% to 30% of other copolymerizable comonomers and latices prepared from (a) 10% to 99.9% of one or more vinyl esters of a carboxylic acid, (b) 0% to 89.9% of one or more alkyl (meth)acrylates, (c) 0.1% to 10% of one or more ethylenically unsaturated carboxylic acids, and (d) 0% to 30% of other copolymerizable comonomers.

The Tg of the final polymer is adjusted by synthesizing copolymers containing various distributions of "hard" monomers (high Tg of the corresponding homopolymer) and "soft" monomers (low Tg of the corresponding homopolymer), as is well known to this art.

The polymerization is carried out, in a manner per se known to this art, in one or more stages.

All conventional dispersion polymerization techniques can be employed. According to the instant invention, an emulsion polymerization technique is preferred.

Thus, the monomers can be pre-emulsified with water in the presence of an anionic or nonionic emulsifying agent, of which approximately from 0.01% to 10% is usually employed, calculated on the basis of the weight of total monomers. A polymerization initiator of the free-radical generator type, such as ammonium or potassium persulfate, can be employed either alone or in combination with an accelerator such as sodium metabisulfite or sodium thiosulfate, sodium formaldehyde sulfoxylate, and metal ions (iron, cobalt, copper, etc.). It is also possible to use free-radical generators such as azo compounds (2,2-azobisisobutyronitrile, 4,4'-azobis(4-cyanopentanoic acid), etc.) or peroxides such as aqueous hydrogen peroxide or tert-butyl or cumene hydroperoxide in combination with a reducing agent.

The initiator and the accelerator, together defining what is typically designated a catalyst, can be employed in a proportion of 0.1% to 2% of each on the basis of the total weight of monomers to be copolymerized. The polymerization temperature advantageously ranges from 30° C. to 100° C., more preferably from 50° C. to 90° C.

Exemplary such emulsifying agents include, in particular, alkali metal and ammonium salts of alkoyl, aryl, alkylaryl and arylalkyl sulfonates and sulfates or polyether sulfates, the corresponding phosphates and phononates, and ethoxylated fatty acids, esters, alcohols, amines, amides and alkylphenols.

In addition to the emulsifier, the polymerization recipe may also include a water-soluble protective colloid: cellulose ethers and hydroxymethyl derivatives, for example hydroxymethyl, hydroxyethyl or hydroxypropyl cellulose, and sodium carboxymethyl cellulose, partially or completely hydrolyzed polyvinyl alcohols, polyacrylic acids in acid or salt form, a poly-N-vinyl amide, for example poly-N-vinyl-pyrrolidone and poly-N-vinyl-N-methylacetamide and poly(methyl vinyl ether/maleic anhydride). It is often advantageous to incorporate in the polymerization recipe chain transfer agents such as mercaptans or halogenated derivatives.

For certain applications, it is also advantageous to crosslink the polymer during polymerization if it is desired to reduce the sensitivity of the film to water and to solvent, or to increase its mechanical properties. In this case, monomers containing a plurality of sites of ethylenic unsaturation are incorporated in the polymerization recipe in amounts ranging from 0.1% to 10%. Exemplary such monomers include ethylene glycol di(meth)acrylate, tripropylene glycol diacrylate, trimethylolpropane tri(meth)acrylate, allyl (meth)acrylate, diallyl maleate, triallyl cyanurate, divinylbenzene and methylenebisacrylamide.

It is possible, in known manner, to polymerize a monomer or a proportion of the monomers in a first stage and then to add the other monomers subsequently such as to form heterogeneous particles. Thus, a proportion or all of the monomers based on carboxylic acid can be added continuously, or in fractions after the polymerization has commenced in order to ensure that a sufficient amount of acidic groups is situated at the surface of the polymer particles formed during the polymerization.

The solids content of the dispersion generally ranges from 20% to 70%, preferably from 40% to 60%, by weight.

After polymerization, the carboxylic latices are usually adjusted to a neutral or basic pH using one or more bases such as alkali metal hydroxides, aqueous ammonia or water-soluble organic amines such as 2-amino-2-methylpropanol, diethylaminoethanol or quaternary ammonium compounds such as tretrabutylammonium hydroxide.

According to this invention, the polyoxyalkyleneamines are employed as a complete or partial replacement for the neutralizing agents of the prior art. The amounts which can be employed may vary over wide limits as a function of the molecular weight and of the functionality of the polyoxyalkyleneamine, of the initial pH of the latex and of the desired pH of the formulation in which the latex is incorporated for the intended application.

In contrast to conventional neutralizing agents, the polyoxyalkyleneamines have the effect of lowering the Tg of the polymer and the MFFT of the dispersion. This effect is all the more pronounced the greater the amount employed. For a given polymer composition, the selection of the most effective polyoxyalkyleneamine and the amount thereof can be determined by one skilled in this art simply by measuring the lowering in the MFFT of the latex, and possibly the change in the Tg.

The amounts which can be employed generally range from 0.1% to 30% by weight relative to the weight of the polymer in the dispersion, most advantageously from 0.5% to 10%. In actual practice, to prepare the dispersion, the addition is normally made to the latex after polymerization. However, it can also be made into the dispersed medium during the polymerization. It is also possible to add the polyoxyalkyleneamine to the coating formulation containing the dispersion.

The polyoxyalkyleneamine may be employed either alone or to supplement one or more conventional basic agents such as those indicated above. The order of addition is of no consequence; the basic agents may thus be added before and/or after addition of the polyoxyalkyleneamine such as to adjust the pH to the desired value. According to the invention, it is desirable that the polyoxyalkeneamine should be at least partly attached to the polymer by an ionic bond via the carboxylic acid groups of the polymer.

The aqueous dispersions containing the carboxylic polymer and the polyoxyalkyleneamine can be formulated into coating compositions.

According to the invention, the coating composition may be prepared by mixing the aqueous dispersion containing the carboxylic copolymer and the polyoxyalkyleneamine with fillers, pigments and other additives, if necessary. Alternatively, the coating composition can be formulated by mixing together the dispersion of the copolymer of acidic pH, the polyoxyalkyleneamine, the fillers, pigments and additives. Exemplary fillers and pigments include kaolin, talc, barium sulfate, titanium dioxide, calcium carbonate, aluminum hydroxide, zinc oxide, and the like. Other additives which are usually employed comprise natural binders such as starch, casein, dispersing agents, thickening agents, antifoaming agents, stabilizing agents, biocides and others. The compositions may be employed as an external or internal paint, glaze, flexible sealing or impermeability coating, coatings, adhesives for ceramics and floor covering, putty, papercoating and the like.

In order to further illustrate the present invention and the advantages thereof, the following specific examples are given, it being understood that same are intended only as illustrative and in nowise limitative. In said examples to follow, all parts and percentages are given by weight unless otherwise indicated.

Also in said examples to follow, the viscosity measurements were carried out using a Brookfield RVT viscometer at 50 rev/min and 23° C.

EXAMPLE 1

This example illustrates the influence of the addition of various polyoxyalkylenemonoamines and diamines on the viscosity and the MFFT of the polymer dispersion.

A mixture comprising an aqueous pre-emulsion of styrene, butyl acrylate and acrylic acid monomers (47.3/48/4.7 weight ratio) was polymerized at 85° C. with 0.5% of an anionic emulsifier and, as the polymerization catalyst, 0.4% of t-butyl hydroperoxide and 0.4% of formaldehyde sulfoxylate.

After polymerization, the dispersion was cooled to 20° C. The dispersion obtained had a solids content of $\approx 50\%$ and the pH=2, which was raised to pH=6.5 using aqueous ammonia.

Using aliquot portions (A to All) the dispersion was then adjusted to pH=8 by adding, with stirring, the necessary amount of aqueous ammonia (control test A) or a polyoxyalkyleneamine in various amounts. If necessary, the pH was adjusted by supplementary addition of aqueous ammonia or of 2-amido-2-methyl-1-propanol (AMP) such as to provide a final pH of 8 in each case.

The amine was added as 50% aqueous solution, or pure when it was water-insoluble.

| Polyoxyalkyleneamines employed: | |
|---|---|
| Poly(oxyethylene/oxypropylene)monoamines: | |
| Jeffamine ® M 600 | PO/EO molar ratio 9/1 approximate MW 600 |
| Jeffamine ® M 1000 | N/N molar ratio 3/19 approximate MW 1000 |
| Jeffamine ® M 2005 | N/N molar ratio 32/3 approximate MW 2000 |
| Polyoxypropylenediamine: | |
| Jeffamine ® D 400 | $H_2NCH(CH_3)CH_2-[OCH_2CH(CH_3)]_x-NH_2$ <br> x = 5-6 <br> approximate MW 400 |
| Modified polyoxypropyleneamine: | |
| Jeffamine ® DU 700 | $H_2NCH(CH_3)CH_2-[OCH_2CH(CH_3)]_n-NH-CO-NH-[CH(CH_3)CH_2O]_n-CH_2CH(CH_3)NH_2$ <br> n = 5.6 - approximate MW 820 |

The properties of the latices obtained are reported in Table 1:

TABLE 1

| Reactants* | A | A1 | A2 | A3 | A4 | A5 | A6 | A7 | A8 | A9 | A10 | A11 |
|---|---|---|---|---|---|---|---|---|---|---|---|---|
| Latex | 100 | 100 | 100 | 100 | 100 | 100 | 100 | 100 | 100 | 100 | 100 | 100 |
| NH₄OH (100%) | 0.3 | | | | | | 0.16 | 0.32 | | | | |
| Aminomethylpropanol | | 1.6 | | 0.8 | 1 | 1.25 | | | | | | 0.16 |
| Jeffamine ® M 600 | | | 11.9 | 7.5 | 4.5 | 2.5 | 8 | | | | | |
| Jeffamine ® M 1000 | | | | | | | | | 16.5 | | | |
| Jeffamine ® M 2005 | | | | | | | | 8 | | | | |
| Jeffamine ® D 400 | | | | | | | | | | 4 | | |
| Jeffamine ® DU 700 | | | | | | | | | | | 8.6 | 7.5 |
| Latex properties | | | | | | | | | | | | |
| % solids content | 50 | 50 | 46 | 47.5 | 47.7 | 47.7 | 48.4 | 47.8 | 50 | 50 | 46 | 46.7 |
| viscosity, mPa s | 4500 | 8100 | 10400 | 13800 | 10900 | 6500 | 15000 | 6800 | 2360 | 13000 | 8660 | 10600 |
| MFFT, °C. | 24.5 | 24 | 15.5 | 17 | 20 | 21.5 | 17.5 | 20.5 | 22 | 23.5 | 21 | 21.5 |
| Tg, °C. | 20 | | 0 | | | | | | | | | |

*parts as solids content

EXAMPLE 2

A styrene/butyl acrylate/acrylic acid latex (36.7/60/3.3 ratio by weight) having a solids content of 50% was prepared by polymerization in aqueous emulsion at 85° C. in the presence of 0.5% of ammonium persulfate and 0.5% of anionic emulsifier.

Using aliquot portions, this latex was neutralized either completely with sodium hydroxide or aqueous ammonia (control latices - Tg 1°-2° C.), or with a Jeffamine ® M 600 or M 2005 in variable amounts and additionally with sodium hydroxide or aqueous ammonia such as to adjust the pH to the value reported in Table 2.

Paint compositions of the following formulation were prepared using the dispersions obtained:

| | Parts by weight |
|---|---|
| Water | Y |
| Latex | X |
| Thickener: Tylose MH 6000 X P (Hoechst) | 19.4 |
| Coatex P 90 thickener | 0.3 |
| Proxel GLX biocide (ICI) | 0.15 |
| Nopco 8034 antifoam (Henkel Nopco) | 0.12 |
| Titanium dioxide = RL68 (Thann & Mulhouse) | 5.3 |
| Calcium carbonate: Durcal 5 (OMYA) | 32.0 |
| Omyalite 90 (OMYA) | 21.3 |

The values X and Y vary such as to provide pigment volume concentration (PVC) ranging from 70% to 80% according to the following indications:

| PVC 70% | X = 19.3 | Y = 11 |
|---|---|---|
| PVC 75% | X = 15 | Y = 11.9 |
| PVC 80% | X = 11.3 | Y = 12.7 |

The viscosity of paints containing the Jeffamine-modified latex was comparable with those of the control latices B and B3.

The accelerated storage stability was measured as the ratio of the Brookfield viscosity after 30 days of storage at 55° C. to the initial Brookfield viscosity. It was excellent.

Finally, the wet abrasion resistance (WAR) was measured according to DIN standard 53778 after 28 days of drying at room temperature.

The characteristics of the paints are reported in Table 3.

EXAMPLE 3

A carboxylic methyl methacrylate/butyl acrylate/acrylic acid (36.7/60/3.3 weight ratio) latex having a solids content of ≈50% and a pH=2 was prepared by aqueous emulsion polymerization.

Using aliquot portions, the latex was adjusted to pH=7.5-7.6 using either sodium hydroxide (control latex C) or a Jeffamine ® and sodium hydroxide as a supplement to adjust the pH to the final value.

The dispersions obtained were added to the paint formulation described in Example 2 and were tested.

EXAMPLE 4

A carboxylic methyl methacrylate/butyl acrylate/acrylic acid (41.7/55/3.3) latex which had a solids content of ≈50% and a pH=2 was employed.

Using aliquot portions, the latex was adjusted to pH=7.5-7.6 by addition of either sodium hydroxide (control latex D) or of Jeffamine ® M 600 in an amount of and 6% and sodium hydroxide.

The dispersions obtained were tested in paint formulations as in Example 2.

EXAMPLE 5

A latex prepared by aqueous emulsion polymerization of styrerie, butyl acrylate, 2-ethylhexyl acrylate, acrylic acid and fumaric acid monomers (38/52/6/2/2) was employed. The solids content of the latex was ≈50%.

Using aliquot portions, the latex was adjusted to pH=7.5-7.6 by addition of either sodium hydroxide (control latex E) or of Jeffamine ® M 600 in an amount of and of sodium hydroxide.

The dispersions obtained were tested in the paint formulations described in Example 2.

The characteristics of the dispersions and those of the paints obtained according to Examples 3 to are reported in Tables 4 and 5.

TABLE 2

| LATEX | NEUTRA-LIZER X | Y (% solids) | LATEX CHARACTERISTICS | | | |
|---|---|---|---|---|---|---|
| | | | solids content % | viscosity mPa s | pH | Tg °C | MFFT °C |
| B | NaOH | | 50 | 460 | 8 | 1 | 2.5 |
| B1 | NaOH | 8.40% Jeffamine ® M 600 | 49.15 | 1840 | 8 | −8 | <0 |
| B2 | NaOH | 8.40% Jeffamine ® M 2005 | 49.25 | 1500 | 8 | −10 | <0 |
| B3 | NH4OH | | 49.8 | 516 | 8 | 2 | 2.5 |
| B4 | NH4OH | 2.50% Jeffamine ® M 600 | 49.8 | 466 | 8 | −2 | 0.5 |
| B5 | NH4OH | 5.00% Jeffamine ® M 600 | 49.8 | 496 | 8 | −5 | <0 |

TABLE 3

| PVC | LATEX | pH | PAINT CHARACTERISTICS | | |
|---|---|---|---|---|---|
| | | | Viscosity mPa s | Storage stability 30d/55° C. | WAR No. cycles |
| 70% | B | 8.7 | 4120 | 1.1 | 1870 |
| | B1 | 8.6 | 4040 | 1 | 7050 |
| | B2 | 8.6 | 4040 | 1 | 4480 |
| | B3 | 8.5 | 4120 | — | 1930 |
| | B4 | 8.5 | 3960 | — | 2430 |
| | B5 | 8.5 | 3920 | — | 5370 |
| 80% | B | 8.6 | 3800 | 1 | 460 |
| | B1 | 8.6 | 3760 | 1 | 1100 |
| | B2 | 8.6 | 3760 | 1 | 930 |

TABLE 4

| LATEX | NEUTRA-LIZER X | Y (% solids) | LATEX CHARACTERISTICS | | | | |
|---|---|---|---|---|---|---|---|
| | | | solids content % | viscosity mPa s | pH | Tg °C | MFFT °C |
| C | NaOH | | 50.2 | 310 | 7.6 | 0 | <0 |
| C1 | NaOH | 3.00% Jeffamine ® M 600 | 49.8 | 292 | 7.6 | | <0 |
| C2 | NaOH | 6.00% Jeffamine ® M 600 | 49.9 | 380 | 7.5 | | <0 |
| C3 | NaOH | 6.00% Jeffamine ® M 2005 | 49.6 | 460 | 7.6 | | <0 |
| D | NaOH | | 50 | 232 | 7.5 | 10 | 7.5 |
| D1 | NaOH | 4.00% Jeffamine ® M 600 | 49.5 | 276 | 7.5 | | 6 |
| D2 | NaOH | 8.00% Jeffamine ® M 600 | 49.8 | 592 | 7.9 | | 2.5 |
| E | NaOH | | 50.1 | 1260 | 7.5 | −6 | <0 |
| E1 | NaOH | 6.00% Jeffamine ® M 600 | 49.8 | 1000 | 7.6 | | <0 |

TABLE 5

| PVC | LATEX | pH | PAINT CHARACTERISTICS | |
|---|---|---|---|---|
| | | | Viscosity mPa s | WAR No. cycles |
| 70% | C | 8.5 | 4040 | 1820 |
| | C1 | 8.5 | 4280 | 3260 |
| | C2 | 8.6 | 4160 | 5880 |
| | C3 | 8.6 | 4240 | 5180 |
| 75% | C | 8.5 | 3960 | 710 |
| | C1 | 8.6 | 4080 | 1210 |
| | C2 | 8.5 | 3800 | 1660 |
| | C3 | 8.6 | 3920 | 1570 |
| 70% | D | 8.5 | 4700 | 1190 |
| | D1 | 8.5 | 4600 | 3910 |
| | D2 | 8.5 | 5000 | 6800 |
| 75% | D | 8.5 | 4200 | 820 |
| | D1 | 8.5 | 4600 | 1440 |
| | D2 | 8.5 | 4500 | 2580 |
| 70% | E | 8.5 | 4640 | 1800 |
| | E1 | 8.5 | 4400 | >10000 |
| 75% | E | 8.5 | 3920 | 1080 |
| | E1 | 8.5 | 3840 | 2480 |

EXAMPLE 6

A styrene/butyl acrylate/acrylic acid (19.4/77.6/3) latex was employed.

The latex was neutralized using either aqueous ammonia (control latex F) or 4.5% of Jeffamine ® 600 and aqueous ammonia such as to adjust the pH to 7.4–7.8.

The dispersions obtained were introduced into a semi-viscous impermeability spreading coating formulation of the following composition:

| | |
|---|---|
| Latex (50% solids content) | 62.26 |
| Coatex P 90 dispersant (Cortex) | 0.17 |
| Nopco 8034 antifoam (Henkel Nopco) | 0.12 |
| Viscoatex 46 acrylic thickener (Coatex) | 0.54 |
| Aqueous ammonia (20%) | 0.17 |
| Proxel XL2 biocide (ICI) | 0.12 |
| Propylene glycol | 1.00 |
| RL68 titanium dioxide (Thann et Mulhouse) | 5.06 |
| Durcal 10 calcium carbonate (Omya) | 23.15 |
| Coatex BR 100 thickener (10%) | 2.53 |
| Water | 4.84 |

The crude dispersions and the formulated coatings were used to produce films on which the relative elongation at break was determined using a tensometer at an applied speed = 50 mm/min at −10° C. and 23° C.

The film was produced by casting in a silicone elastomer mold. Wet film thickness = 2 mm. Dry film thickness = 0.5 mm (23° C. 50% relative humidity, 7 days). The elongation measurements were carried out on dumbell-shaped 20×4 mm type H3 test specimens cut from the film. The mean elongation at break (%) is reported, together with the standard deviation obtained from 10 measurements.

|  | F | F1 |
|---|---|---|
| Latex Characteristics: | | |
|  | NH₄OH | NH₄OH + Jeffamine ® M 600 |
| Solids content, % | 50 | 50 |
| Viscosity (mPa s) | 1000 | 3740 |
| pH | 7.8 | 7.4 |
| TG, °C. | −21 | −26 |
| MFFT | <0 | <0 |
| Characteristics of the Unformulated Film: | | |
| Elongation at break (%) | | |
| −10° C. | 508 ± 21 | 761 ± 54 |
| 23° C. | 620 ± 39 | 882 ± 27 |
| Coating Characteristics: | | |
| pH | 8.5 | 8.5 |
| Viscosity (mPa s) | 4640 | 4400 |
| Elongation at break, % | | |
| −10° C. | 151 ± 10 | 223 ± 20 |

EXAMPLE 7

A styrene/butyl acrylate/acrylic acid (52.5/41.5/6) latex was employed.

The latex was neutralized using 3% of Jeffamine ® M 600 and aqueous ammonia in the amount required to adjust the pH to 8. The control latex G was neutralized entirely with aqueous ammonia.

Both dispersions were formulated for application as an adhesive for ceramic tiles.

| Latex (50% solids content) | 14 |
|---|---|
| Methocel J75 MS cellulose ether (DOW) | 0.25 |
| Coatex P 90 dispersant | 0.60 |
| Butyl glycol | 1.40 |
| White spirit | 1.40 |
| Nopco 8034 antifoam | 0.12 |
| Proxel XL2 biocide (ICI) | 0.20 |
| E.V. chalk (Omya) | 25 |
| S1 silica (silica and kaolin) | 49 |
| aqueous ammonia q.s. pH = 9 | |
| Water | 7.90 |

The adhesives were tested according to the UEAtc directive for the Approval Of Adhesives For Ceramic Coatings (July 1979).

Operating conditions = 30 min mixing at 80 rev/min
Viscosity measurement = after 24 hours at rest - Brookfield RVT inert spindle No. 7, 23° C., 50 rev/min
5×5 cm ceramic tiles, concrete support
Paste spread with a toothed 6×6×6 mm spatula with square teeth.

|  | G | G1 |
|---|---|---|
| Latex Characteristics: | | |
|  | NH₄OH | NH₄OH + Jeffamine ® M 600 |
| Solids content, % | 50.3 | 50.3 |
| Viscosity, mPa s | 630 | 790 |
| pH | 8 | 8 |
| MFFT | 34 | 32 |
| Tg | 32 | |
| Adhesive Characteristics: | | |
| pH | 8.2 | 8.1 |
| Viscosity, mPa s | 72800 | 80000 |
| Pick force, daN/cm² | | |
| 7 d dry | 17 | 21 |
| 7 d dry + d wet | 3.8 | 4.1 |
| 28 d dry | 29 | 29 |
| 28 d dry + 1 d wet | 7.6 | 8.2 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A low MFFT aqueous dispersion of film-forming ethylenic/carboxylic polymer particulates, said aqueous dispersion comprising an effective, at least partially neutralizing amount of a polyoxylalkyleneamine, said polyoxyalkyleneamine comprising at least one primary and/or secondary amine functional group per molecule thereof.

2. The aqueous dispersion as defined by claim 1, said ethylenic/carboxylic polymer comprising the polymerizate of at least one alkyl ester of acrylic or methacrylic acid and at least one ethylenically unsaturated carboxylic acid.

3. The aqueous dispersion as defined by claim 2, said ethylenic/carboxylic polymer comprising the polymerizate of at least one alkyl ester of acrylic or methacrylic acid and/or a vinyl ester of a carboxylic acid and/or a vinyl aromatic monomer and at least one ethylenically unsaturated carboxylic acid.

4. The aqueous dispersion as defined by claim 3, said at least one ethylenically unsaturated carboxylic acid comprising from 0.1% to 10% by weight of the total amount of comonomers polymerized.

5. The aqueous dispersion as defined by claim 1, comprising from 0.2% to 30% by weight of said polyoxyalkyleneamine relative to the weight of said polymer particulates.

6. The aqueous dispersion as defined by claim 5, comprising from 0.5% to 10% by weight of said polyoxyalkyleneamine.

7. The aqueous dispersion as defined by claim 1, said polyoxyalkyleneamine having a molecular weight ranging from about 140 to 10,000.

8. The aqueous dispersion as defined by claim 7, said polyoxyalkyleneamine having a molecular weight ranging from about 400 to 4,000.

9. The aqueous dispersion as defined by claim 1, said polyoxyalkyleneamine comprising a primary monoamine.

10. The aqueous dispersion as defined by claim 1, said polyoxyalkyleneamine comprising a primary diamine.

11. The aqueous dispersion as defined by claim 1, said polyoxyalkyleneamine comprising a primary triamine.

12. The aqueous dispersion as defined by claim 1, the polyoxyalkylene moiety of said polyoxyalkyleneamine comprising polyoxypropylene.

13. The aqueous dispersion as defined by claim 1, the polyoxyalkylene moiety of said polyoxyalkyleneamine comprising a polyoxyethylene/polyoxypropylene block copolymer.

14. The aqueous dispersion as defined by claim 13, wherein said polyoxyalkylene moiety the ratio of the number of propylene oxide recurring structural units to the number of ethylene oxide recurring structural units is greater than 1.

15. The aqueous dispersion as defined by claim 1, essentially devoid of any coalescing agent.

16. The aqueous dispersion as defined by claim 1, comprising a latex.

17. The aqueous dispersion as defined by claim 1, comprising crosslinked ethylenic/carboxylic polymer particles.

18. The aqueous dispersion as defined by claim 1, having a solids content ranging from 20% to 70% by weight.

19. The aqueous dispersion as defined by claim 19, having a solids content ranging from 40% to 60% by weight.

20. The aqueous dispersion as defined by claim 1, having a neutral or basic pH.

21. The aqueous dispersion as defined by claim 1, said polyoxyalkyleneamine being at least partially ionically bonded to said ethylenic/carboxylic polymer via carboxylic acid groups thereof.

22. The aqueous dispersion as defined by claim 1, said ethylenic/carboxylic polymer comprising an emulsion polymerizate.

23. A coating composition comprising the aqueous dispersion as defined by claim 1.

24. An adhesive comprising the aqueous dispersion as defined by claim 1.

25. The coating composition as defined by claim 23, further comprising at least one filler, pigment, binder, dispersing agent, thickening agent, antifoaming agent, stabilizing agent or biocide.

26. A substrate at least partially coated with the coating composition as defined by claim 23.

* * * * *